United States Patent

Harding

[15] 3,675,221

[45] July 4, 1972

[54] MAGNETIC CORE MEMORY LINE SINK VOLTAGE STABILIZATION SYSTEM

[72] Inventor: Philip A. Harding, Palos Verdes, Calif.

[73] Assignee: Electronic Memories and Magnetics Corporation, Los Angeles, Calif.

[22] Filed: June 29, 1970

[21] Appl. No.: 50,563

[52] U.S. Cl. ............340/174 TB, 340/174 LA, 340/174 NC, 340/174 TL

[51] Int. Cl. ......................................G11c 5/02, G11c 11/06

[58] Field of Search ..............................340/174 TB, 174 NC

[56] References Cited

UNITED STATES PATENTS 3,550,098 12/1970 Heightley et al. ................340/174 TB
3,025,411 3/1962 Rumble............................340/174 TB
3,445,831 5/1969 Cooper et al. ...................340/174 TB
3,408,637 10/1968 Gibson et al.....................340/174 TB
3,516,078 6/1970 Matick et al......................340/174 TB
3,419,856 12/1968 Doughty ..........................340/174 TB

*Primary Examiner*—Stanley M. Urynowicz, Jr.
*Attorney*—Lindenberg, Freilich & Wasserman

[57] ABSTRACT

A magnetic core memory line sink voltage stabilization system is disclosed using a current or voltage source to charge a group of selected lines. The sink ends through which the lines are charged are terminated with the approximate characteristic impedance of all lines connnected at their sink end to a common junction, and a balanced transformer is employed to keep the potential of the junction substantially constant when a current pulse is applied at the drive end of a selected pulse. The primary of the transformer is connected in series with a current pulse source, and the secondary is connected in parallel with the terminating resistor. The turns ratio of the transformer and polarity of the secondary winding are so selected as to inject a current into the common junction substantially equal to that driven through the line by the current pulse source, and of proper polarity, to maintain the potential of the common junction substantially constant.

12 Claims, 3 Drawing Figures

FIG. 3

PHILIP A. HARDING
INVENTOR.

BY

Lindenberg, Freilich & Wasserman
ATTORNEYS

PATENTED JUL 4 1972 3,675,221

INVENTOR.
PHILIP A. HARDING
BY
Lindenberg, Freilich & Wasserman
ATTORNEYS

MAGNETIC CORE MEMORY LINE SINK VOLTAGE STABILIZATION SYSTEM

BACKGROUND OF THE INVENTION

This invention relates to a drive system for a magnetic core memory, and more particularly to a current drive circuit having the ability to deliver a current pulse having the fastest possible rise time without producing currents and oscillations on unselected lines.

In magnetic core memories, it is common practice to arrange toroidal cores in a rectangular array of rows and columns. Separate lines pass through the cores in both rows and columns to addressably write in and read out data by selectively switching cores. For example, in a coincident current core memory, each row and each column of cores has a drive line through which half select current is driven in a given direction to write, and in the opposite direction to read. Although only one core is selectively switched by coincident half-select currents at the intersection of a row and a column, all the other unselected cores are present as inductive loads on the lines selectively driven. A similar arrangement is used in a linear-select core memory but with full current on one line to read. Accordingly, although specific reference is made to coincident-current core memories, the present invention has application to both types of memories in common use.

Each drive line may be considered as a transmission line that requires charging and proper termination to minimize current rise time of a drive pulse and to prevent reflections of the drive pulse. The problems of charging and providing proper termination are compounded in line selection schemes employing N separate sink switches for N groups of S lines at one end, and S separate drive switches each connected to a unique group of N lines at the other end such that activation of one switch at each and uniquely selects one line even though the switch activated at each end is connected to other unselected lines. These problems are further compounded by the lengths of switch connecting leads which are unavoidable in an economically packaged memory array.

OBJECTS AND SUMMARY OF THE INVENTION

An object of this invention is to provide a system for efficiently charging a line of a memory array and optimumly terminating the line thus charged for transmission of a drive pulse through it.

Still another object of this invention is to provide a system for efficiently charging a plurality of lines simultaneously and optimumly terminating all lines thus charged through a common resistor.

Still another object of the invention is to properly terminate a group of lines with a common resistor through which virtually no power is expended when a current pulse is driven through a selected line.

Still another object of this invention is to not only properly terminate a group of lines with a common resistor but to also insert power from the drive end to allow improved read and write current rise times.

These and other objects of the invention are achieved by activating switching means at opposite ends of a selected line to connect thereto a charging means (current source or a voltage source) at one end and an inactive drive current pulse source at the other end and reflected to the one end which is terminated with a resistor equal to the approximate characteristic impedance of the selected line in parallel with all other unselected lines connected to a common junction at that one end and including the impedance of the wire connecting the common junction to the charging means. When the inactive drive current pulse source is then activated, current is driven through a series connected primary winding of a transformer having its secondary connected in parallel with the terminating resistor. The turns ratio 1:X of the transformer and the polarity of the secondary winding are selected to maintain the potential of the common junction substantially constant, thereby preventing undesired currents from flowing in unselected lines connected to the common junction, where X corresponds to the turns in the primary winding is or and is normally equal to one but may be optimumly greater than one to insert power from the drive end for a faster rise time of the drive current pulse.

DESCRIPTION OF THE PREFERRED EMBODIMENTS

Figure 1:
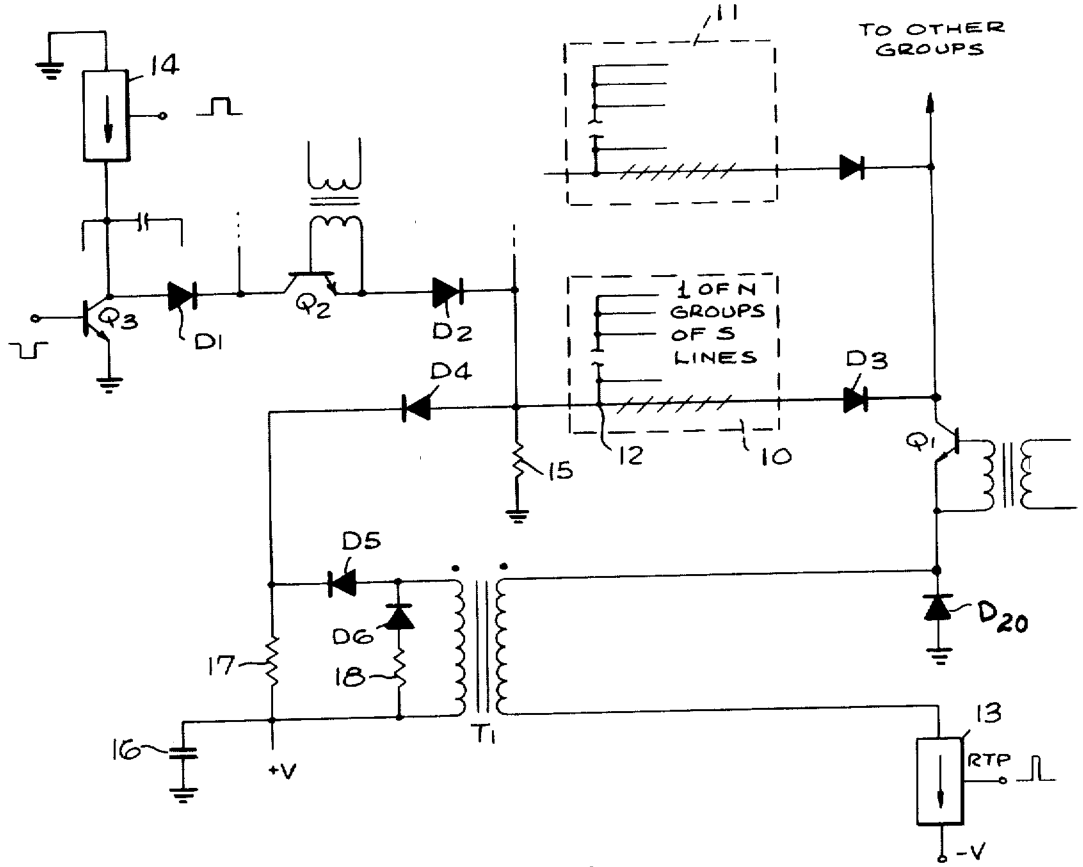
FIG. 1 is a schematic diagram of a line drive system embodying the present invention.

Referring first to only FIG. 1, a plurality of drive lines, such as X drive lines of a coincident current core memory, are arranged into N groups of S lines. All lines of a given group, such as a group 10 are connected to a common junction 12 at one end, referred to hereinafter as the sink end. The other end of each line of a group, referred to hereinafter as the drive end, is connected to a different current pulse source, such as a current pulse source 13, by a floating transformer coupled transistor switch $Q_1$ and the primary winding of a transformer $T_1$.

The sink end of each group of S lines is connected to a current pulse source 14 by a floating transformer coupled transistor switch $Q_2$. A transistor $Q_3$ is normally conducting to provide a low impedance to ground for unselected groups which time share the current pulse source 14. The transistor $Q_3$ is turned off simultaneously with the activation of the current pulse source 14 and the selection of a group of S lines, such as the group 10 by activation of the transistor $Q_2$. The line to be driven may be selected at the same time by activation of a transistor $Q_1$ connected to the first line of each of N groups. Thus, by activating transistors $Q_1$ and $Q_2$, a unique line is selected for drive current when the current pulse source 13 is activated. Diodes $D_1$, $D_2$ and $D_3$ are selection diodes provided to prevent undesired current paths through unselected lines when the circuit of FIG. 1 is incorporated in a full memory system, as will be more fully described with reference to FIG. 2.

When the transistor $Q_2$ is activated, the current pulse source 14 supplies energy to charge the selected group of lines to a predetermined voltage very nearly equal to +V. Since the current pulse source 14 is a very high impedance load on the lines of the selected groups, the load at the sink end may be approximated by a transmission line with the characteristic impedance at the sink end of N drive lines in parallel and an open circuit at the drive end. Consequently, the voltage produced by activating the source 14 is reflected at the open-circuit drive ends to the sink ends where it is reflected back down the drive lines again.

The reflections of the voltage wavefront charge the junction 12 towards +V, and as soon as a diode $D_4$ biased by a very large resistor 15 is forward biased, the voltage on the lines of the group selected tend to stabilize at +V less the voltage drop across the diode $D_4$. A filter capacitor 16 helps stabilize the power supply voltage. Once the diode $D_4$ is forward biased, the sink end of the selected group of lines is terminated by a resistor 17 equal to the approximate characteristic impedance of N drive lines connected to the junction 12, thereby minimizing further reflections of the voltage wavefront. Thus the resistor 17 terminates the drive lines once they have been charged to the desired voltage +V. The approximate characteristic impedance to which the resistor 17 is made equal can be calculated or determined experimentally by varying the resistance until the lines are terminated with a resistor that absorbs as much power as possible to minimize reflections as much as possible.

Figure 2:
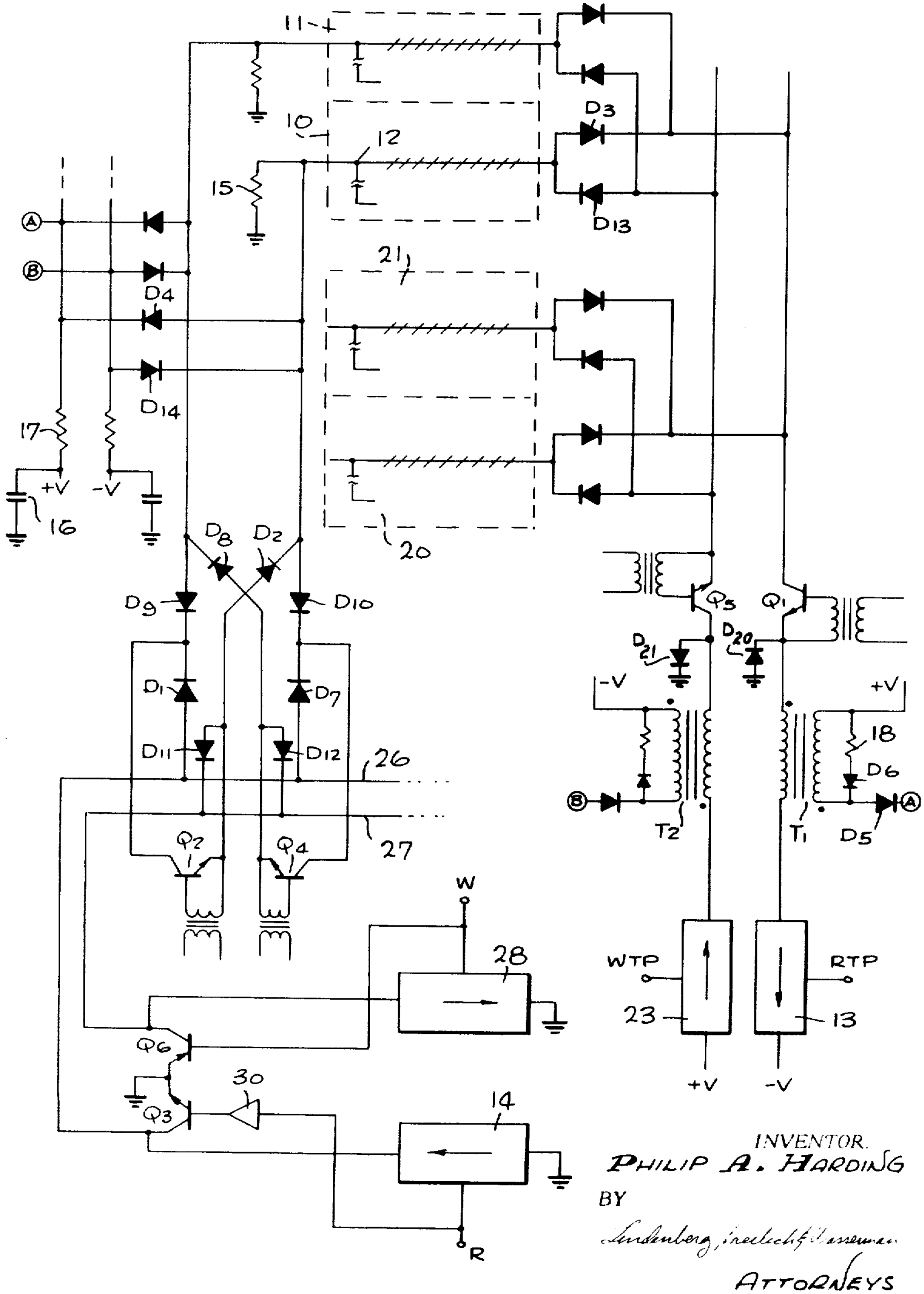
FIG. 2 is a schematic diagram of a part of the addressable drive system for drive lines of one coordinate in a magnetic core array embodying the invention illustrated in FIG. 1.

After sufficient time has been allowed for the voltage to stabilize, the current pulse source 13 is activated to drive current through a line selected by the transistor $Q_1$. The polarity of the current indicated by an arrow in the block representing the current pulse source may be for a read cycle. For a write cycle, a separate transistor couples the selected line to a source of current pulses of opposite polarity as shown in FIG. 2.

The drive current from the source 13 would normally cause the potential of the junction 12 to fall due to the source impedance at that junction which consists of the unselected lines, the impedance through the resistor 17, the impedance through the transistor $Q_2$, and the impedance through the current pulse source 14. However, in accordance with the present invention, a current pulse induced in the secondary winding of the transformer $T_1$ forward biases a diode $D_5$ and causes a desired current equal to that of the current pulse source 13 to transfer from the junction 12. This maintains the potential at the junction 12 at a constant level because current from the source 14 to the junction 12 does not change, thereby preventing currents through unselected lines. When the current pulse source 13 is turned off, a diode $D_6$ is forward biased to discharge stored energy in the transformer through a resistor 18. The current pulse source 14 is deactivated at the same time, as are the transistors $Q_1$ and $Q_2$. When the current pulse source 14 is deactivated, the transistor $Q_3$ is turned on.

The transformer $T_1$ is provided with a one-to-one turns ratio so that current from the secondary into the common junction 12 is substantially equal to the current through the transistor $Q_1$. In that manner, a single terminating resistor is employed with a single balanced transformer to provide optimum termination for a group of lines. The ability to thus properly terminate the selected group allows fast charging of the selected line, which in turn improves the current rise time of the current pulse through the selected line while maintaining the junction stable at approximately +V.

The manner in which current of opposite polarity is driven through a selected line for a write cycle, will now be described with reference to FIG. 2 where like elements are referred to by the same reference numerals employed in FIG. 1. Points A and B in the upper left are to be understood as being connected to the respective points A and B in the lower right of FIG. 2.

Additional groups 20 and 21 of S lines are shown which, like the groups 10 and 11, are paired with a pair of transistor switches (not shown) in the same manner that the groups 10 and 11 are paired with transistors $Q_2$ and $Q_4$. The corresponding drive line of each group, namely the first drive line, is connected through buffer diodes to a pair of drive selection transistors $Q_1$ and $Q_5$ to which control signals are applied selectively by an address decoder (not shown) in accordance with the logic equations $Q_1 = B_S \cdot W$ and $Q_5 = B_S \cdot R$, where $B_S$ is the decoder output, and $W$ and $R$ are write and read control signals.

The transistors $Q_1$ and $Q_5$ are connected to pulsed current sources 13 and 23. During a read cycle, while transistor $Q_1$ is turned on, the current source 13 is turned on by a read timing pulse RTP. Similarly, during a write cycle, while transistor $Q_5$ is turned on, the current source 23 is turned on by a write timing pulse WTP. Diodes coupling the transistors $Q_1$ and $Q_5$ to the drive lines, such as diodes $D_3$ and $D_{13}$, prevent drive current through the selected line from disturbing unselected lines when timing pulses are applied to the drive current pulse sources 13 and 23.

The memory array is provided with two distribution lines 26 and 27, one for each polarity of two current pulse sources 14 and 28 for charging drive lines in a selected group to the proper voltage for drive current from the activated one of current sources 13 and 23. Transistors $Q_3$ and $Q_6$ are normally conducting to short the distribution lines 26 and 27, and the current pulse sources 14 and 28 are inactive.

During a read cycle, the transistor $Q_3$ is turned off by the read control signal R via an inverter 30. Simultaneously, the current source 14 is activated and a transistor switch from one of N pair is selectively turned on, such as transistor $Q_2$ to read from a line in group 10. The current source 14 supplied energy to charge the common junction of the selected group of lines to a predetermined positive potential very nearly equal to +V at which time the diode $D_4$ is forward biased. The very large resistor 15 returns the potential of the common junction to circuit ground potential when the current source 14 is not active. Once the common junction of the selected group of lines has achieved full voltage, the pulsed drive current source 13 is activated in response to a read timing pulse RTP.

A write cycle is carried out in a similar manner, charging the common junction 12 to −V by turning off a transistor $Q_6$, turning on a current source 28, and then activating the drive current pulse source 23. Selection of a line in group 10 is made by activating transistor $Q_4$. Upon completion of the write cycle, the transistor $Q_6$ is turned on again to discharge the line 27.

Transistor $Q_4$ is used to select the group 11 during a read cycle in a manner similar to how transistor $Q_2$ is used to select the group 10. The transistor $Q_2$ is then used to select a line in group 11 during a write cycle. Thus, once a voltage is applied to one of the lines 26 and 27 with a polarity that is appropriate for the direction of current flow desired, one of the transistors $Q_2$ and $Q_4$ is activated depending upon both the direction of current flow desired and the particular drive line through which current is to flow. Diodes $D_7$ to $D_{12}$ cooperate with diodes $D_1$ and $D_2$ to provide cross-coupling of transistors $Q_2$ and $Q_4$ between lines 26 and 27 and groups 10 and 11. For example, a drive current in the write direction in a line of group 10, the distribution line 27 is switched to a negative voltage and the transistors $Q_4$ and $Q_5$ are activated. When the drive current pulse source 23 is activated, current flows through a diode $D_{13}$, diode $D_{10}$, transistor $Q_4$ and diode $D_{12}$ to the current source 28. A transformer $T_2$ couples a pulse current to the junction 12 through a diode $D_{14}$ to maintain that junction at a substantially constant potential just as the transformer $T_1$ couples a pulse of opposite polarity through the diode $D_4$ during a read cycle.

The embodiment of FIGS. 1 and 2 will charge the selected group of lines as fast as possible by holding both ends of the selected group open until the common junction at the sink end of the selected group has been charged sufficiently to forward bias a diode, and thereby connect a terminating resistor to the junction. That minimizes ringing time to make faster read and write cycles possible. After the desired potential has been reached, the terminating resistor then maintains an approximate characteristic impedance at the sink end of the lines to minimize ringing of noise. The drive end of the selected line may also be terminated with an approximate characteristic impedance that is connected to the selected line only while the drive current pulse source is active, such as by a resistor connected between the emitter of the line selection transistor $Q_1$ and −V, and a resistor connected between the collector of the selection transistor $Q_5$ and +V.

According to the present invention, the voltage at the sink end of the selected line is maintained substantially constant in order that current not flow through unselected lines. However, this embodiment of FIGS. 1 and 2 will consume power in the terminating resistor because once the coupling diode is forward biased, current from the charging current source will flow through the terminating resistor, and once the drive current pulse source is activated, a current pulse is transformer coupled into the terminating resistor to effectively replace the charging current being shifted from the terminating resistor to the selected line. The energy being lost then is supplied by the drive current pulse source. To minimize energy lost in the terminating resistors, particularly that which has to come from the drive current pulse source, the arrangement of FIG. 3 may be used wherein like or corresponding elements are identified by the same reference numerals as in FIG. 1.

Figure 3:
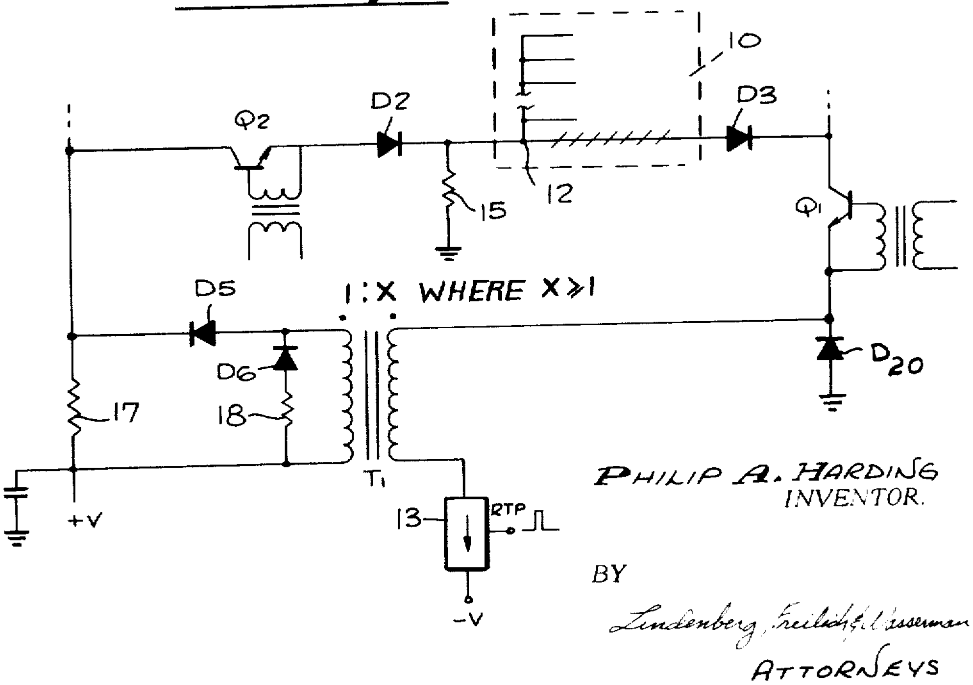
FIG. 3 is a schematic diagram of a second embodiment of the invention.

The essential difference in the embodiment of FIG. 3 is that a voltage source (+V) is used to charge the junction 12 through the terminating resistor 17 and the group selection switch $Q_2$. Once the junction 12 has been charged, very little current will flow through the transistor $Q_2$ because the only current path is through the very large resistor 15. Then when the drive current pulse source 13 is activated, a current pulse is driven through the selected line, but not through the terminating resistor 17 because the secondary of the transformer $T_1$ generates a current pulse which is substantially equal to the current pulse being driven through the selected line. This is in the secondary-to-primary turns ratio 1:X because of the one-to-one turns ratio when X is to one. That then leaves virtually no current flow through the terminating resistor 17 to minimize energy loss even though this resistor terminates junction 12 along with all circuitry connected to that end of the selected line.

Another embodiment is illustrated by FIG. 3 when X in the ratio 1:X shown is selected to be greater than one. When the current source is activated, the current in the secondary will then be larger than the selected drive line current. That portion of the current in the secondary winding which is equal to the drive line current I will flow through the transistor $Q_2$ into the selected drive line. The excess of the current XI in the secondary winding will flow through the resistor 17, thereby raising the voltage at the junction of diode $D_5$ and resistor 17 to a larger value than +V. That additional voltage will raise the voltage at the junction 12 to decrease the time required to build up the drive current through the selected line, i.e., to decrease the rise time of the drive current pulse. Accordingly, in addition to properly terminating the sink end of a selected group of lines with a common resistor, this embodiment of X greater than one will increase the sink voltage only during the current drive time, i.e., during the period of the current drive pulse, to reduce the rise time of the drive current.

To determine the optimum value of X for this third embodiment, it is necessary to determine what turns ration will produce the greatest voltage $V_{17}$ across the resistor 17. The voltage $V_{17}$ is given by the equation $$V_{17} = (X-1)\, IR_{17}$$

where $I$ is the drive current through the primary winding of the transformer $T_1$, i.e., the desired drive current through the selected drive line, and $R_{17}$ is the resistance of the resistor 17. The voltage $V_p$ across the primary winding is then given by the equation $$V_p = XV_{17}$$

The value of $V_p$ is equal to the absolute value of the supply voltage −V. Solving for $X$ then yields its optimum value. If $X$ is made larger or smaller, the voltage $V_{17}$ will decrease, and as $X$ is made even larger, the voltage $V_{17}$ will decrease below the voltage level for a one-to-one turns ratio.

It should be noted that in all embodiments, the junction between the primary winding of the transformer $T_1$ and the drive current selection transistor $Q_1$ is preferably clamped by a diode $D_{20}$ to prevent the voltage $V_p$ form driving that junction more negative than about −0.7 volts, i.e., more negative than the voltage drop across the diode $D_{20}$ when forward biased. A diode $D_{21}$ oppositely poled is provided for drive currents of opposite polarity, as shown in FIG. 2.

Although a particular embodiment of the invention has been described and illustrated herein, it is recognized that modifications and variations may readily occur to those skilled in the art. Consequently, it is intended that the claims be interpreted to cover such modifications and equivalents.

What is claimed is:

1. A circuit for applying a current pulse to a given line of a plurality of drive lines of a magnetic core memory, said given line having a current sink end connected to the current sink end of all other ones of said plurality of drive lines, each line having a current drive end electrically remote from said sink end, said plurality of drive lines having a given characteristic impedance at their common sink end with respect to circuit ground, comprising:

- means for selectively charging said plurality of lines to a predetermined potential with respect to said circuit ground by applying a current of a given polarity to their common sink end while their drive ends are substantially open, and for terminating their common sink end with a resistor having a value approximately equal to said characteristic impedance;
- a pulsed drive current source; and
- a transformer having a primary winding connected in series between said pulsed drive current source and said drive end of said given line, and a secondary winding having one terminal connected to said means at one end of said resistor and another terminal connected to the other end of said resistor, said secondary winding being wound with respect to said primary winding such that, upon activating said pulsed drive current source, current is introduced at said common sink end of said plurality of lines by induced current in said secondary winding to maintain said plurality of lines charged at substantially said predetermined potential.

2. A circuit as defined in claim 1 wherein said charging means comprises:

- a selectively activated switch;
- a source of current of said given polarity coupled to said sink end of said plurality of lines by said selectively activated switch;
- a voltage source substantially equal to said predetermined potential connected to one terminal of said resistor; and
- a diode coupling the other terminal of said resistor to said common sink end, said diode being poled to be back biased until said common sink end is charged to said predetermined potential.

3. A circuit as defined in claim 1 wherein said charging means comprises:

- a voltage source connected to one terminal of said resistor; and
- means for selectively coupling the other terminal of said resistor to said common sink end such that substantially all impedance in the charging path from said voltage source to said common sink end of said plurality of lines is in said resistor.

4. A circuit as defined in claim 3 wherein said voltage source is substantially equal to said predetermined potential, and the turns ratio of said transformer is 1:1.

5. A circuit as defined in claim 3 wherein said voltage source is substantially equal to said predetermined potential, the secondary-to-primary turns ratio of said transformer is 1:X, and X is a value greater than one.

6. A circuit as defined in claim 5 wherein the value of X is selected to increase said predetermined potential to a voltage level greater than the level of said voltage source while said drive current source is being pulsed.

7. A circuit for applying a current pulse to a given one of a plurality of drive lines of a magnetic core memory, each of said given lines of a magnetic core memory, each of said given lines having a current sink end and a current drive end, all of said sink ends being connected together to form a common sink end, and all of said plurality of lines thus connected together having a given characteristic impedance at said common sink end with respect to circuit ground, comprising:

- means for charging said plurality of lines to a predetermined potential with respect to said circuit ground by applying a current of a given polarity to their sink ends while their drive ends are substantially open;
- a voltage source substantially equal to said predetermined potential;
- impedance means connected in series between said voltage source and said common sink end of said plurality of lines, said impedance means being approximately equal to said given characteristic impedance;
- a pulsed drive current source; and
- a transformer having a primary winding connected in series between said pulsed drive current source and said drive end of said given line, and a secondary winding having one terminal connected to said impedance means at one end thereof remote from said given line and another terminal coupled to said impedance means at another end opposite said one end, said secondary winding being wound with respect to said primary winding such that, upon activating said pulsed drive current source, current is introduced at said sink end by induced current in said secondary winding of said given polarity equal to current driven through said drive end of said given line to maintain said plurality of lines charged to said predetermined potential.

8. A circuit as defined in claim 7 wherein said charging means comprises a source of current of said given polarity coupled to said common sink end by a selectively activated switch, and said impedance means includes a series connected diode poled to be back biased until said plurality of lines have been charged sufficiently to forward bias said series connected diode.

9. A circuit for applying a current pulse to a given one of a plurality of drive lines of a magnetic core memory, each of said given lines having a current sink end and a current drive end, all of said sink ends being connected together to form a common sink end, and all of said plurality of lines thus connected together having a given characteristic impedance at said common sink end with respect to circuit ground, comprising:

a voltage source;

impedance means connected in series between said voltage source and said common sink end, said impedance means being approximately equal to said given characteristic impedance;

a pulsed drive current source; and a transformer having a primary winding connected in series between said pulsed drive current source and said drive end of said given line, and a secondary winding having one terminal connected to said impedance means at one end thereof remote from said given line and another terminal coupled to said impedance means at another end opposite said one end, said secondary winding being wound with respect to said primary winding such that, upon activating said pulsed drive current source, current is introduced at said common sink end by induced current in said secondary winding to maintain said common sink end at a substantially constant potential while said pulsed drive current source is activated.

10. A circuit for applying a current pulse to a selected drive line of a magnetic core memory, said line having a current sink end connected to current sink ends of a plurality of lines at a junction, each line having a current drive end substantially open except while a current pulse is being driven therethrough, comprising:

means for charging said junction to a predetermined potential with respect to circuit ground by applying a current of a given polarity to said junction while drive ends of all lines are maintained substantially open, said charging means including means for terminating said plurality of lines at said junction with approximately the characteristic impedance of said plurality of lines connected to said junction;

a pulsed drive current source connected to said drive end of said selected line; and a balanced transformer having a primary winding connected in series with said pulsed current source at said drive end of said selected line and a secondary winding connected between two points of said means between which impedance substantially equal to said characteristic impedance appears, said secondary winding being wound with respect to said primary winding such that current is introduced at said junction by induced current in said secondary winding to maintain said plurality of lines charged to a substantially constant potential.

11. A circuit as defined in claim 10 wherein said charging means comprises:

a source of current of said given polarity coupled to said junction by a selectively activated switch;

a voltage source substantially equal to said predetermined potential;

a diode; and a resistor approximately equal to said characteristic impedance having one terminal connected to said voltage source, and the other terminal coupled to said junction by said diode, said diode being poled to be back biased until said junction is charged to said predetermined potential, said resistor being connected in parallel with said secondary winding.

12. A circuit as defined in claim 10 wherein said charging means comprises:

a voltage source substantially equal to said predetermined potential; and a resistor approximately equal to said characteristic impedance connected in series between said voltage source and said junction such that substantially all impedance in the charging path from said voltage source to said junction is in said resistor, and said resistor is connected in parallel with said secondary winding.

* * * * *